Figure 5:
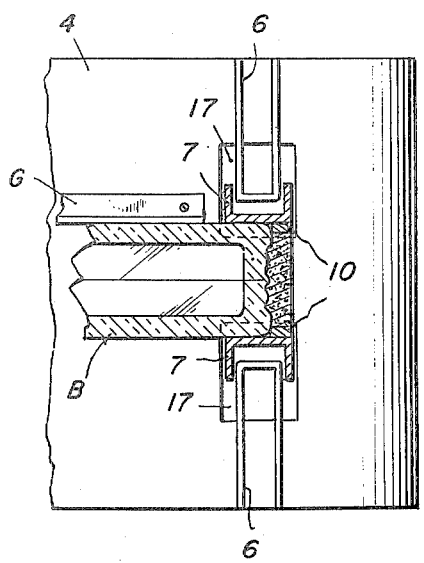

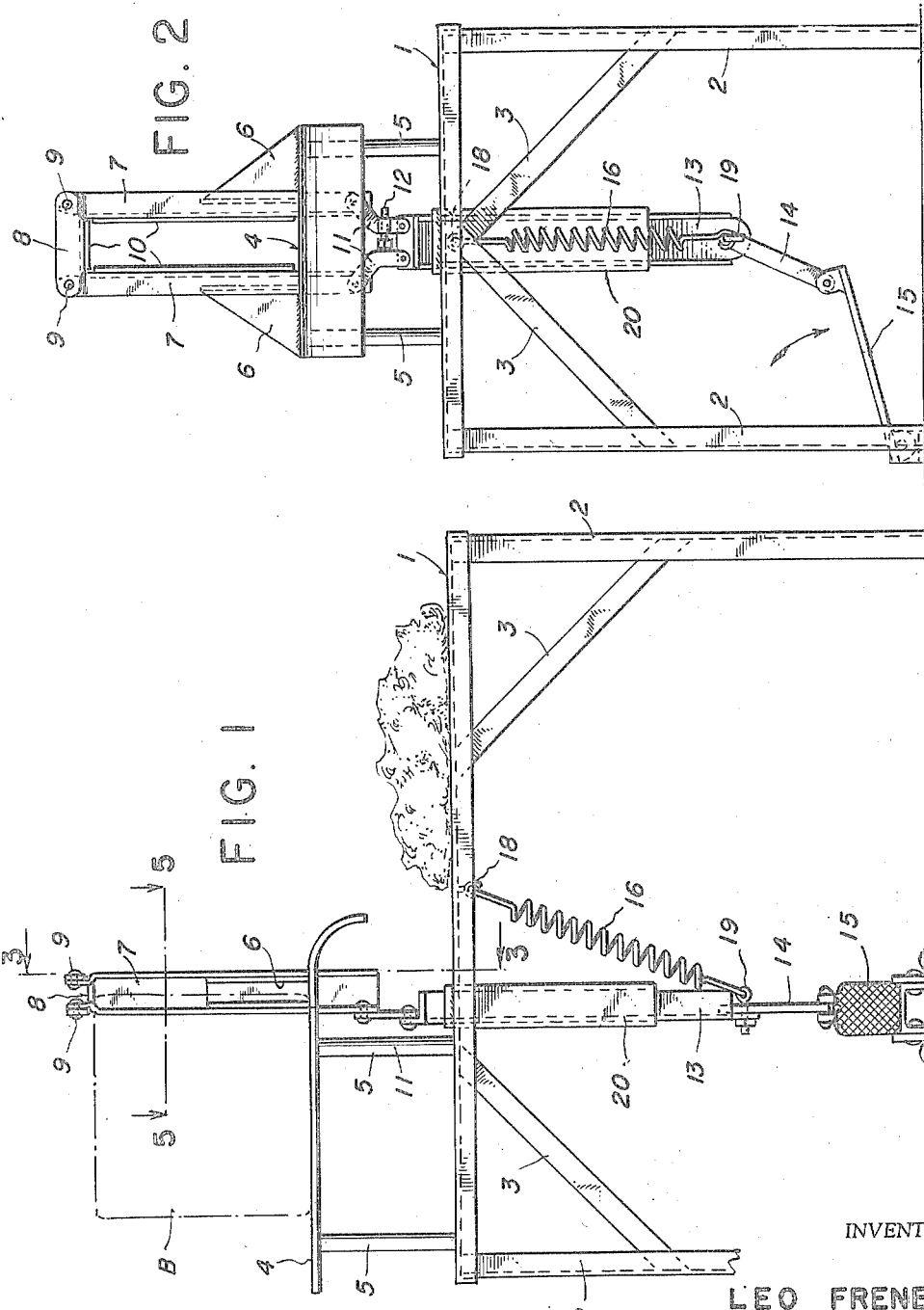

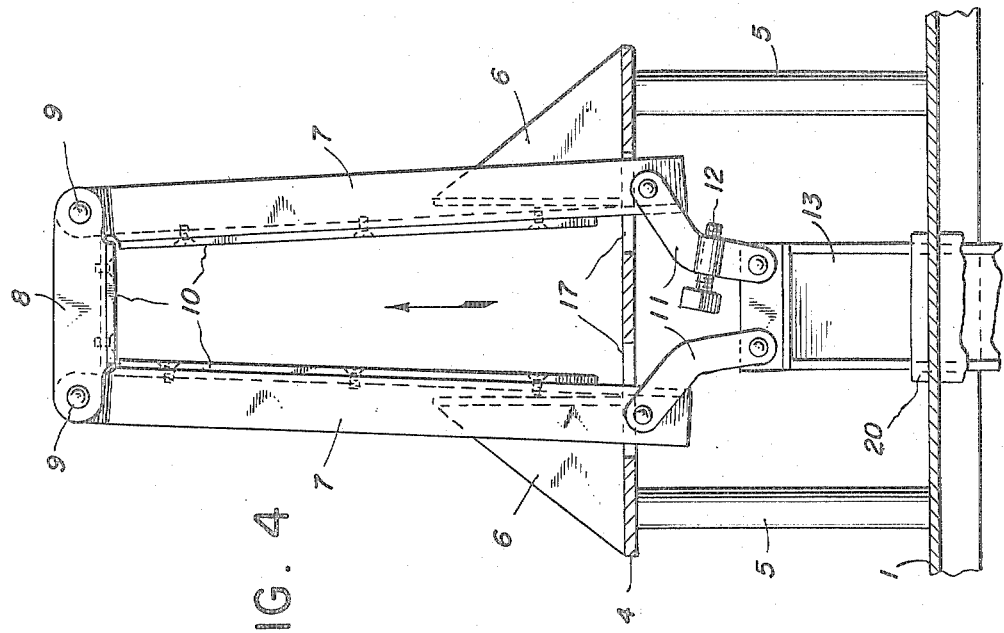
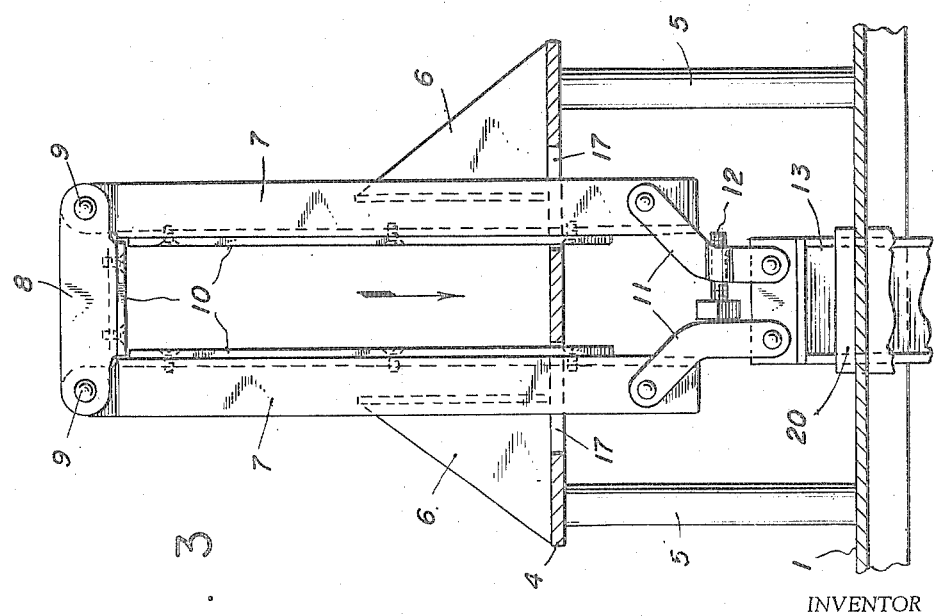

INVENTOR
LEO FRENE,
BY Wenderoth, Lind and Ponack
ATTORNEYS

United States Patent Office 2,757,532
Patented Aug. 7, 1956

2,757,532

MORTAR GUIDE MACHINE

Leo Frene, Washington, D. C.

Application March 19, 1953, Serial No. 343,346

5 Claims. (Cl. 72—130)

The invention relates to a machine which is highly useful in uniformly guiding the thickness of mortar applied by hand to a face of a brick or glass block for building walls or tiers of brick and/or glass block laid in courses.

The laying of brick and glass block in accordance with convention practice is more or less time consuming and expensive, since skilled labor must perform the exact task of laying a bed or mortar of uniform thickness to each individual brick or block to fill spaces between and bind together each brick or block in the position which it will assume in the wall structure after the mortar has hardened. The skilled workman must remove excess mortar and point up the brickwork and blockwork in the customary manner taking into account the difference in the consistency of the mortar which causes variations in the shrinkage of the mortar to render non-uniform the spacing between adjacent bricks, blocks and tiers. The non-uniformity in the mortar thickness is particularly objectionable in laying glass blocks since the appearance of the finished wall is very markedly affected by the non-uniformity of only a few of the mortar joints in large wall structures constructed of glass blocks. Wall structures formed of glass block are constructed in curved as well as straight sections and it is extremely difficult to adjust the mortar thickness in the arcuate portions of the wall with the required accuracy in order that the observer does not recognize the glaring defects of non-uniform thickness in the mortar joints so that these present the impression of a poorly executed job. The mortar joints stand out under practically all conditions of illumination in contrast to the uniform rectangular faces of the semi-transparent glass block.

The machine of the present invention provides a highly efficient, novel and useful device for laying glass block whereby the work of uniformly guiding the thickness of the mortar joint may be satisfactorily performed by unskilled workmen and whereby the wall and tier structure is built much more quickly and much more advantageously to produce a remarkable saving in the cost of construction and to provide a great improvement in the construction and appearance of the finished wall.

To illustrate the improvement obtained with the machine of the present invention, the laying of glass block furnished in standard sizes of 4¾" x 5¾", 7¾" x 7¾" and 11¾" x 11¾" (height or width), required a highly skilled workman to lay ¼" or ³⁄₁₆" mortar joints between adjacent blocks and adjacent courses, all joints to be plumb and true and to be filled completely with mortar. The joints are to be tooled to a smooth finish. The skilled workman strives to obtain the accuracy of about ¹⁄₁₆" in the control of the mortar thickness and his success depends upon his skill and experience. Curved walls, foyers and building entrances require great skill. Poor workmanship and inattention to the joint thickness requirement is evident even to the untrained eye, particularly where indirect lighting effects are obtained by providing artificial illumination within the structure. The prismatic, ribbed, plane or fluted face of the light-directional block must be kept clean of mortar. Skilled workmen may lay from eighty to one hundred fifty blocks by the conventional method per day (8 hours). Up to five hundred blocks have been laid by unskilled workmen by the machine of the present invention.

An object of the invention is to provide a novel mortar guide machine for paying brick and glass block wherein the workman manually applies mortar in a uniform thickness to a face of the block or brick resting on a table and engaged by the foot-operated mortar guide means of the machine which controls the thickness of mortar applied to said face.

A further object of the invention is to provide a mortar guide machine comprising a retractable face guide and mortar shield disposed at the end of a table, said mortar face guide connected by means of a yoke connecting link which moves above and below the table level by the action of a foot pedal connected by a spring mechanism engaging a vertical connection element which is secured to the yoke connecting link.

A further object of the invention is to provide adjustable thickness gauging means secured to the inner periphery of the body of the retractable face guide, said gauging means accurately engaging the side and top surface of the brick or block at an end face thereof, and a mortar shield integral with the bottom portion of the body of the retractable face guide to prevent the manually applied mortar from coming in contact with any other face of the brick or block.

Other and further objects of the present invention will appear from the more detailed description set forth below, its being understood that such more detailed description is given by way of illustration and explanation only and not by way of limitation, since various changes therein may be made by those skilled in the art without departing from the scope and spirit of the present invention.

Figure 7:
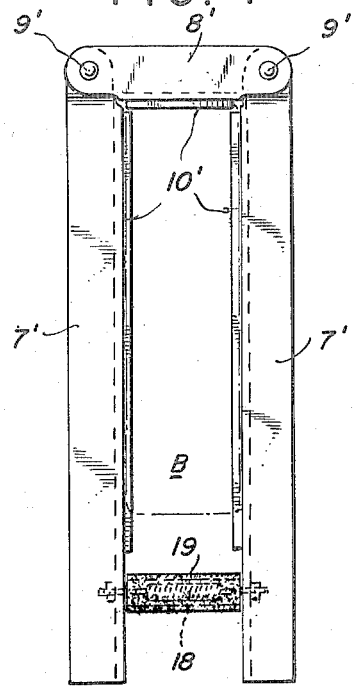
Figure 6:
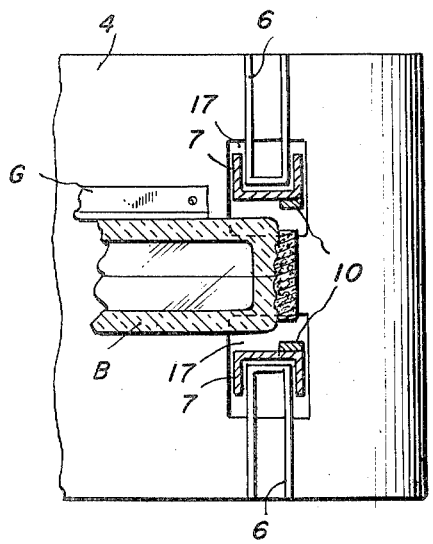
Figure 8:
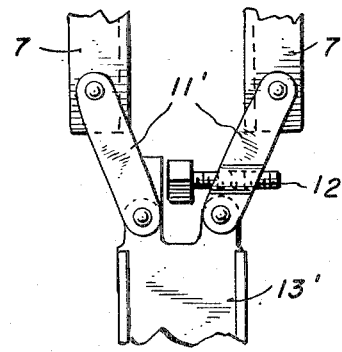

In connection with that more detailed description, there is shown in the drawings, in Figure 1, an elevation, partly in section of the apparatus of the invention; in Figure 2, an end view in section of the apparatus of the invention; in Figures 3 and 4, end views along lines 3—3 of Fig. 1, in section, of an embodiment of the invention; in Figure 5, a view partly in section and partly in elevation of a detail of the invention, along line 5—5 of Fig. 1; in Figure 6, a view partly in section and partly in elevation of a detail of the invention, along line 5—5 of Fig. 1; in Figure 7, a view partly in section and partly in elevation of a detail of the invention; in Figure 8, a view partly in section and partly in elevation of a detail of the invention.

In accordance with the present invention, the retractable face guide is mounted at the end of a portable table which serves to hold the material used by the workman for preparing the block and brick with a uniformly thick coating of mortar and the table may be moved or wheeled on the ground or on a scaffold to bring the brick and block to the job. As shown in Fig. 1, the table top 1 on legs 2 which are braced with braces 3 is sufficiently large to hold the mortar supplies and the block at a station separate from the station where mortar is applied to the face of the block.

The retractable face guide body is constructed of side members 7 and 7 (Figs. 1–4 and 7 and 8) which are joined at the top by top cross piece 8. Rivets 9 secure the top cross piece 8 to the side pieces and side pieces 7 may be moved obliquely away from the rivet connections so that the face of the block is readily disengaged after mortar has been applied thereto without disturbing the applied thickness of the mortar. The retractable face guide is moved up and down by means of a foot pedal 15 which is connected by link 14 to a spring 16 and to an inner yoke connecting arm 13 telescopically housed in housing 20 which is joined to the table top 1.

The other end of spring 16 is connected to the bottom of the table top at an adjustable distance away from the connection of housing 20 which encloses yoke connecting arm 13. By varying the position of the connection of the upper part of spring 16 to the top of the table, varying spring tension is had for adjusting the normal position of the yoke connecting arm and the retractable face guide and as is shown in Figs. 1–4. The yoke connecting arm 13 is secured to links 11 which are retractable away from the pivot connections. The yoke connecting links 11 are secured at their upper ends to the side pieces 7 and the pivoted connections permit the lateral oblique movement of side pieces 7 to part from each other, opening links 11 from their normal engagement under the tension of spring 16. The normal position of links 11 is adjusted by means of adjusting bolt 12 threaded in one of the links 11 and the head of the bolt abutting the inner surface of the other links to provide the normal position of these links. The separation of links 11 from each other in the normal position is thus readily adjusted by suitable adjustment of the bolt 12.

In Fig. 7 a variation of the adjustment feature provided by the yoke connecting links 11 and arm 12 is shown wherein the yoke arm and links are replaced by telescoping spring connection comprising an outer spring housing 19 and an inner spring member 18 attached to the bottom portion of the side pieces 7'.

The retractable face guide body comprising the top cross piece 8 and the side pieces 7 (8' and 7' respectively in Fig. 7) is arranged above the block support 4 as shown in Figs. 1–4 to permit the block to be placed on the support for the intimate engagement of all of the block surfaces at the end of the block where mortar is applied.

In Figs. 5 and 6, taken along lines 5—5 of Fig. 1, the plumb facing of uniform thickness of mortar applied to the end of the glass block is clearly illustrated. In Fig. 5, side pieces 7 are in accurate engaging contact with the sides of the block B and the position of the thickness gauging means 10 and its abutment at the corner of the block permit the retraction of the side pieces 7 and the gauging means 10 to leave the uniformly applied mortar coating undisturbed by the release of the foot pedal pressure (foot pedal 15).

Any mortar which for any reason adheres to the sides of the thickness gauging means 10 is swept across the front face of the mortar shield 6'. In practice, practically no mortar is lost from the sides of the applied coating since the thickness of the gauging means is about ⅛" to about ¼" and the highly machined finish of the gauging element prevents adherence of loose mortar to the surfaces thereof.

To accommodate the lateral movement parting the side pieces from each other by virtue of the foot pedal and yoke action, slots of predetermined width 17 are furnished in the block support 4 and as shown in Figs. 3–6. As shown in these figures, the gauging means 10 is attached to the retractable face guide body by means of set screws and the accuracy of machining and placement of these gauging elements on the face guide body permits tolerances better than ¹⁄₁₆" with respect to the variations in the thickness of the finished mortar coating.

In view of the polished nature of the metal surface of the retractable face guide body and the gauging means, there is no adherence of mortar to these members during the application of a mortar coating to the block.

This produces an unexpected rapidity of operation and cleanliness in appearance of the mortared block in the wall construction. No opportunity is had in view of the mortar shield construction for the face of the brick to be dirtied as in the normal operation. Valuable time is saved in laying tiers and walls.

The gauging element 10 may be changed to provide a variety of sizes and may be modified to provide any taper as desired to control the facing at the end of the mortar coating. The above tolerance is illustrative of still finer accuracy which may be obtained should the occasion and construction warrant this.

The end of the block support 4 may be curved abruptly downwardly to prevent any excess mortar from being built up on the mortar support and as shown in Fig. 1. The height of the mortar support may be varied to accommodate the working convenience of the workman by the suitable selection of the supporting members 5 as shown in Figs. 1–4.

The machine of the present invention is well adapted for the various sizes and types of trowels which are normally used in laying block. Because the amount applied to both the bed joint and the head joint has been accurately and uniformly controlled by the gauging means, there is no need for the customary tamping and leveling of the block as is required in the conventional block laying operation. The block is simply set in place (gently) and the operator is immediately free to proceed with the next block. Having laid the course with uniform mortar thickness, the leveling of the course is very simple and successive courses are rapidly and accurately laid until the entire panel is completed.

The conventional methods heretofore employed have required the additional time of the operator, in the usual case up to ⅓ more than that in laying, in cleaning and striking the finished panel because of mortar splash and droppings on the face of the block. This difficulty has been entirely eliminated in accordance with the machine of the invention. As shown in Figs. 5 and 6, the gauge face G formed by narrow strips of hardened steel is accurately fastened to the face guide body by means of countersunk flat headed screws.

While the construction of the device employed as disclosed is preferred, it is to be understood that the invention is not restricted thereto, but that changes falling within the scope of the appended claims may be made without sacrificing any of the advantages of the invention.

Having thus disclosed the invention, what is claimed is:

1. A foot operated mortar guide machine for applying a uniform predetermined thickness of mortar to a face of a brick or glass block comprising, a table, a block support on said table having slots for guiding a face guide body across said face of said block, a vertically slidable retractable face guide body movable through said slots constructed of two spaced side pieces jointed to a pivotally connected top cross piece which engage the sides and top respectively at the face of the brick or block to which mortar is applied, thickness gauging members secured to the inner periphery of said side pieces and top cross piece, a yoke arm movable through a slot in said table, yoke connecting links pivotally connected to said yoke arm and pivotally attached at their upper ends to said side pieces below said support, a link connecting said yoke arm to a foot pedal and a spring connected at one end to said last named link at its connection with said yoke arm and at the other end to said table whereby the tension of said spring maintains the side pieces in an open position under the absence of any foot pressure to retract said yoke arm and to pull down said side pieces upon said block.

2. A mortar guide machine as claimed in claim 1, wherein an adjusting bolt is provided in one of said yoke connecting links to adjust the opening of said side pieces from each other.

3. A mortar guide machine as claimed in claim 1, wherein said retractable face guide body is provided with an integrally secured mortar shield at the bottom portion thereof.

4. A mortar guide machine as claimed in claim 1, wherein said side pieces are maintained in adjustable separation by means of a spring connection in a telescoping housing for said spring.

5. A mortar guide machine as claimed in claim 1, wherein said thickness gauging means are constructed of narrow strips of hardened steel secured to said retractable face guide by means of countersunk screws.

References Cited in the file of this patent

UNITED STATES PATENTS 2,551,911    Tengstedt _____ May 8, 1951